Dec. 21, 1948.　　　　L. O. GREELEY　　　　2,456,827
SICKLE BLADE GRINDER

Filed Aug. 19, 1946　　　　　　　　　　2 Sheets-Sheet 1

INVENTOR
LEO O. GREELEY
BY Liverance and
Van Antwerp
ATTORNEYS

Dec. 21, 1948.    L. O. GREELEY    2,456,827
SICKLE BLADE GRINDER
Filed Aug. 19, 1946    2 Sheets-Sheet 2
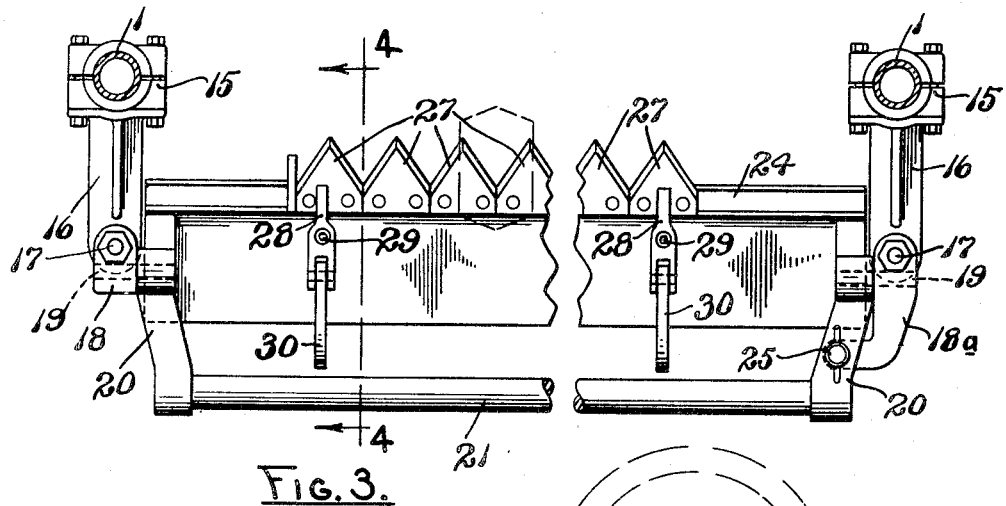
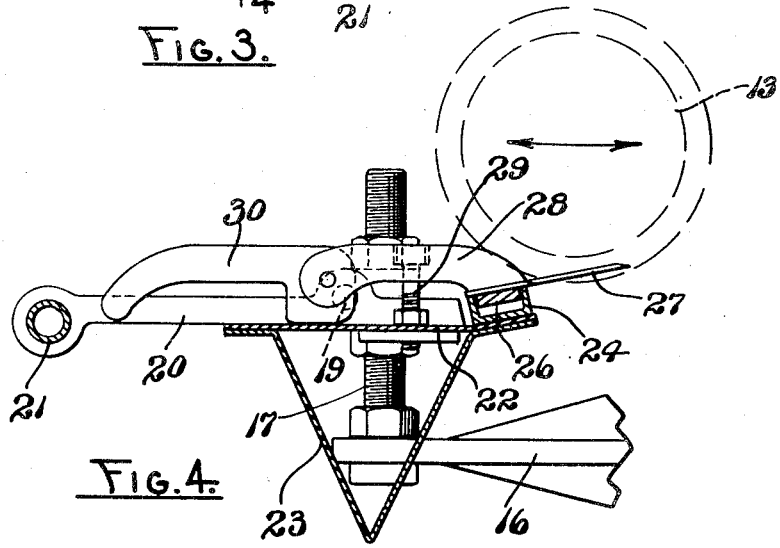
INVENTOR
LEO O. GREELEY
BY Liverance and
Van Antwerp
ATTORNEYS Patented Dec. 21, 1948

2,456,827

UNITED STATES PATENT OFFICE 2,456,827

SICKLE BLADE GRINDER

Leo O. Greeley, Cadillac, Mich., assignor to General Sales Company of Cadillac, Cadillac, Mich., a limited partnership of Michigan Application August 19, 1946, Serial No. 691,498

4 Claims. (Cl. 51—36)

The present invention relates to a novel, practical and very efficient grinder for the cutting members or sections of a moving machine. Said sections, also called sickles, are permanently secured by riveted connections to an elongated bar, extending forwardly therefrom, which bar is connected by a universal joint with the pitman of a mowing machine. The bar with the attached grass cutting sections is very rapidly reciprocated in the direction of the length of the mowing machine cutter bar which is pulled forwardly over the ground and has a plurality of spaced guards in the form of forwardly projecting pointed horizontally slotted fingers as a part of the cutter bar construction, with which the cutting sections cooperate, to sever grass a short distance above the ground. The cutting sections or sickles are of a substantially triangular shape having cutting sides converging toward each other toward their forward ends, and which sides are of a beveled form, coming to a sharpened edge at each side of the longitudinal center line of each of said sections or sickles.

The cutting edges are subject to dulling in service. Also, they are continually subject to the danger of dulling by small stones, occasional wires, bottles and other edge damaging articles, this necessitating that the cutting edges of the cutting sections shall be rather frequently sharpened and restored. It is a primary object and purpose of the present invention to provide a simple, very practical and effective machine for rapidly sharpening such cutting edges. The sharpening heretofor in large measure, has been by removing the reciprocating member of the cutter bar assembly with all of the cutting sections secured thereto, and either filing or grinding each of the cutting sections by the use of a file or grindstone. The job of sharpening is long and tedious, and uniformity of sharpening is substantially impossible. With my invention, the sharpening is attained very rapidly and with a substantial uniformity.

An understanding of the invention may be had from the following description, taken in connection with the accompanying drawings, in which:

Fig. 3 is a horizontal longitudinal section through the machine immediately above the work holding portion thereof, which is shown in plan.

Fig. 4 is a transverse vertical section substantially on the plane of line 4—4 of Fig. 3 looking in the direction indicated.

Like reference characters refer to like parts in the different figures of the drawings.

Figure 2:
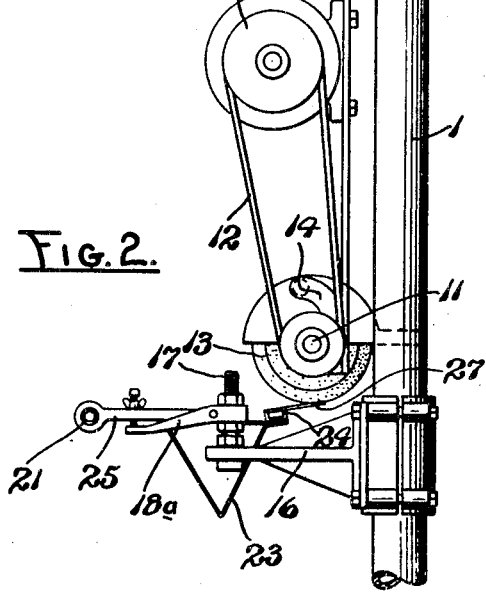
Fig. 2 is an end elevation thereof.

In the construction of the machine, two vertical posts 1 are spaced apart a necessary distance, greater than the length of a mowing machine sickle or section bar, and may be supplied with supporting foot members 2 to rest on the floor; or the posts 1 may be securely held in vertical position by any other means sufficient for the purpose. At the upper end of each of the posts 1 a split sleeve 3 is fixedly secured, each of the parts of said sleeve at the front side of the machine being provided with an integral arm or bracket 4 extending therefrom (Fig. 2), serving to support a horizontal track 5 extending between them and which, in practice, is of a T-section inverted, as shown.

Figure 1:
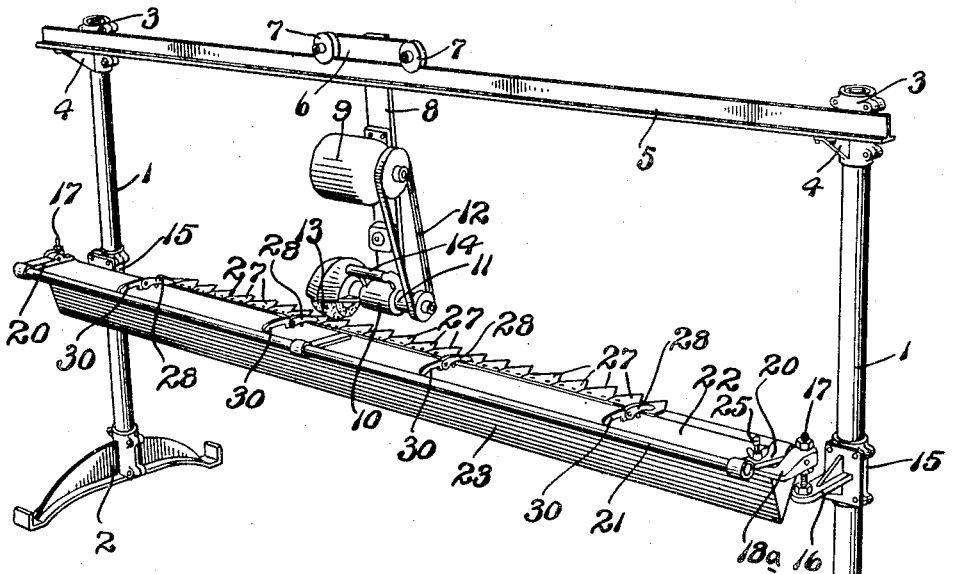
Fig. 1 is a perspective view of a grinding machine organized and adapted for sharpening, by grinding, the cutting edges of the sickles or cutting sections of mowing machines or similar machines.

A carriage is provided to move lengthwise on the track. It includes a horizontal bar 6 with grooved rollers 7 mounted adjacent the ends of the bar and located in front thereof for rotation, the upper edge portion of the track 5 entering in the grooves of the rollers. From the central portion of the carriage bar 6, a bar 8 extends downwardly. An electric motor 9 is mounted on the bar 8 between its ends and at its front side. At the lower end of bar 8 a horizontal journal 10 is secured through which a shaft 11 extends. The shaft is driven by an endless belt 12 from the shaft of the motor 9, as shown, said belt passing around suitable pullies connected, to shaft 11 and the motor shaft. At the end of the shaft 11, a relatively small grinding wheel 13 is secured having a suitable protecting hood over its upper portion, and having peripheral surfaces converging outwardly from the sides of the wheel to the center thereof. The journal at 10 has a forwardly and upwardly extending handle 14 (Fig. 1) which is adapted to be grasped for swinging the bar 8 and the parts connected therewith from front to rear and vice versa, the axis about which swinging being the upper edge of the track 5, the grooves of the rollers permitting a limited swinging movement.

Between the ends of the posts 1, other split sleeves 15 are secured and from the front member of each of said sleeves, a horizontal bracket 16 extends forward. It is, of course, to be understood that the sleeves 3 and 15, divided and split as they are and are secured together by bolts, are capable of vertical adjustments on the posts 1. At the front end of each of the brackets 16 a bolt 17 is connected extending upwardly through each bracket and above the same, and secured by a nut (Fig. 2), on each of the bolts 17, a supporting member 18 and 18a are connected by means of upper and lower nuts as shown, extending in a forward direction from said bolts. Said members 18 and 18a have horizontal pins 19 secured thereto which extend toward each other and inwardly beyond the inner sides of said members.

Two arms 20 are mounted for rocking movement on the pins 19. Between the outer ends of said arms a horizontal rod 21 is located and secured. At the under side of the inner end portions of said arms a plate 22 of sheet metal is permanently secured which is strengthened and reinforced by a V-shaped sheet metal longitudinal member 23 spot welded or otherwise permanently secured in place. Said plate 22 and its reinforcing member 23 extend between the arms 20 and at their rear edges, beyond the inner ends of the arms, are inclined upwardly at a small angle to the horizontal, as shown in Fig. 4. A channel bar 24 is secured by welding or other permanent connection lengthwise of the end at the upper side of the inner edge portion of the plate 23 (Fig. 4). An adjustable screw 25 through the interned end of support 18a, provides a stop controlling the lowermost portion of plate 22, as shown.

The channel 24 serves as a support and holder, in connection with releasable clamps hereafter described, for the section or sickle bar of a mowing machine with its attached sections or sickles. Such bar 26 to which the cutting sections 27 are riveted, is received in the channel 24 with the cutting sections extending rearwardly and inclined upwardly as shown in Fig. 4. The clamps, a spaced number of which are used in the length of the plate 22, consist of immediate clamping arms 28 which, between their ends, are mounted on vertical bolts 29 (Fig. 4) to have a limited rocking movement. At their forward ends, they are pivotally mounted to a cam arm or handle 30. On turning the operating handles 30 to down position, as in Fig. 4, the rear ends of the immediate clamping members 28 are forced by cam action against the upper side of the sections 27 clamping the section or sickle bar securely in position on the channel bar 24. On elevating the handles 30 at their outer ends, the clamps are released and each clamp structure may be turned about the vertical axis of its associated bolt 29 whereby the several sections which have been ground, and the bar 26 to which they are permanently connected are removable from the machine.

It is evident that the grinding wheel 13 may be moved with the carriage 6 in the direction of the length of the track 5 to bring the peripheral surface of the wheel between the cutting edges of adjacent sections 27 for grinding such edges which are of a beveled character (Fig. 3), and sharpening them to a desired degree of sharpening. By use of the handle 14, the grinding wheel may be swung from front to rear and vice versa. The operation of the mechanism is simple and the cutting edges of adjacent sections, singly or two at a time, may be ground in succession, moving from one to the other, and governing the position of the grinding wheel by the control exerted through the handle at 14.

The structure is economically produced, is sturdy and durable in construction, and with it the sharpening by grinding of the cutting sections of mowing machines is rapidly and efficiently attained.

The invention is defined in the appended claims and is to be considered comprehensive of all forms of structure coming within their scope.

I claim:

1. A machine of the class described comprising, a frame, a horizontal upper track on said frame, a carriage mounted to traverse said track and to rock thereon on an axis parallel to the track, a depending support on said carriage, a grinding wheel rotatably mounted on the lower part of said depending support, means for rotating said grinding wheel, an elongated horizontal support mounted on said frame below said track, means for clamping a blade on the horizontal support and in the path of said grinding wheel, means for pivotally mounting said horizontal support to swing on an axis longitudinal thereof, means for manually swinging said support on its pivot during the grinding operation, and adjustable means to limit the swinging movement of said support in the direction which moves the blade toward the grinding wheel.

2. The elements of claim 1 in which the lower part of said horizontal support is a V-shaped sheet metal structure having outturned flanges at its upper edges and the top is sheet metal attached to said flanges.

3. In a structure as described, spaced apart vertical posts, brackets connected with said posts below and between their ends extending forwardly therefrom, supporting members connected for vertical adjustment with the outer end portions of said brackets, horizontal arms pivotally connected between their ends to said supporting members, a rod extending between and connected to the front ends of said arms, a generally horizontal plate secured to and extending between said arms back of the rod, means for releasably clamping work to the ground at the upper side and rear portion of said plate, a horizontal track bar extending between said posts above said plate, a carriage mounted to longitudinally traverse said track bar, and a rotatably driven grinding wheel carried by and located below said carriage.

4. A construction as defined in claim 3, said carriage being mounted on said track for rocking movement about a horizontal axis, and a bar connected to said carriage extending downwardly at the lower portion of which said grinding wheel is rotatably mounted for suspension from the carriage, said grinding wheel being movable from front to rear or vice versa on rocking movement of the carriage.

LEO O. GREELEY.

REFERENCES CITED

The following references are of record in the file of this patent:

UNITED STATES PATENTS

| Number | Name | Date |
|---|---|---|
| 1,868,603 | Henderson | July 26, 1932 |

FOREIGN PATENTS

| Number | Country | Date |
|---|---|---|
| 373,257 | Germany | Apr. 10, 1923 |
| 778,281 | France | Dec. 15, 1934 |